United States Patent
Supinski et al.

(12) 
(10) Patent No.: US 6,679,705 B2
(45) Date of Patent: Jan. 20, 2004

(54) METHOD FOR THE SELECTION AND USE OF A SYSTEM OF FEMININE HYGIENE PRODUCTS

(75) Inventors: Jodi Elizabeth Supinski, Cincinnati, OH (US); Brian Kenneth Burgdorf, Norwood, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 10/273,909

(22) Filed: Oct. 18, 2002

(65) Prior Publication Data

US 2003/0091969 A1 May 15, 2003

Related U.S. Application Data

(60) Provisional application No. 60/334,874, filed on Nov. 15, 2001.

(51) Int. Cl.⁷ .............. A47F 7/00; G09B 25/00; G09F 19/00
(52) U.S. Cl. .............. 434/429; 434/430; 340/825.35
(58) Field of Search .................. 434/238, 262, 434/273, 365, 377, 428–430; 600/584; 604/363, 378, 904; 340/5.9, 825.35; 435/173.3; 424/204.1, 206.1; 422/947; 73/73, 38; 211/49.1

(56) References Cited

U.S. PATENT DOCUMENTS

| | | |
|---|---|---|
| 2,071,040 A | 2/1937 | Lloyd |
| 2,360,573 A | 10/1944 | Mena |
| 3,860,304 A | 1/1975 | Bolton |
| 4,064,880 A | 12/1977 | Logan |
| 4,181,176 A | 1/1980 | Frazier |
| 4,267,726 A | 5/1981 | Noik |
| 4,389,764 A | 6/1983 | Flander et al. |
| 4,429,806 A | 2/1984 | Schwarzli |
| 4,706,845 A | 11/1987 | Schnurer et al. |
| 4,750,640 A | 6/1988 | Kobeck et al. |
| 4,767,022 A | 8/1988 | Oldorf |
| 4,963,072 A | 10/1990 | Miley et al. |
| 5,047,947 A | 9/1991 | Stump |
| 5,167,345 A | 12/1992 | Bleeker |
| 5,178,169 A | 1/1993 | Lamle |
| 5,256,572 A | 10/1993 | Tang et al. |
| 5,361,627 A * | 11/1994 | Levesque ................ 73/73 |
| 5,467,285 A | 11/1995 | Flinn et al. |
| 5,520,203 A | 5/1996 | Segertstrom |
| D371,707 S | 7/1996 | Miles |
| D372,272 S | 7/1996 | Frisch |
| 5,564,007 A | 10/1996 | Kazen-Goudarzi et al. |
| 5,564,547 A | 10/1996 | Ranon et al. |
| 5,639,235 A | 6/1997 | Lapointe et al. |
| 5,644,693 A | 7/1997 | Fitzgerald et al. |
| 5,679,369 A * | 10/1997 | Brown-Skrobot ........ 424/431 |
| 5,691,919 A | 11/1997 | Gemmell et al. |
| 5,797,755 A | 8/1998 | Montgomery |
| 5,817,077 A * | 10/1998 | Foley et al. ............ 604/363 |
| 5,821,872 A | 10/1998 | Brown et al. |
| 5,839,585 A | 11/1998 | Miller |
| 5,862,947 A | 1/1999 | Wiegner et al. |
| 5,865,322 A | 2/1999 | Miller |
| 5,897,542 A | 4/1999 | Lash et al. |
| 5,947,302 A | 9/1999 | Miller |
| 6,093,027 A | 7/2000 | Unger et al. |
| 2002/0046132 A1 * | 4/2002 | Raye et al. ............. 705/26 |
| 2003/0023189 A1 * | 1/2003 | Kuo ..................... 600/584 |
| 2003/0092145 A1 * | 5/2003 | Jira et al. ............ 435/173.3 |

FOREIGN PATENT DOCUMENTS

| | | |
|---|---|---|
| DE | 805066 | 5/1951 |
| DE | 31 44 944 A1 | 5/1983 |
| DE | 36 41 614 A1 | 6/1988 |
| FR | 1356956 | 2/1964 |
| GB | 2 271 559 A | 4/1994 |

OTHER PUBLICATIONS

U.S. patent application Ser. No. 10/238,502, Stults, filed Sep. 10, 2002.

* cited by examiner

*Primary Examiner*—Joe H. Cheng
(74) *Attorney, Agent, or Firm*—Ian S. Robinson; Kevin C. Johnson

(57) ABSTRACT

Methods provide for the selection and use of a system of feminine hygiene products. More particularly, the present invention is directed to a method in which information is collected from a consumer regarding certain of her menstrual cycle. The information collected is used to select a particular system of feminine hygiene products for use by the consumer. The system of products selected is then revealed to the consumer for use by the consumer to achieve a reduction in soiling and improvements in comfort as compared to the use of a single type of feminine hygiene products.

16 Claims, No Drawings

METHOD FOR THE SELECTION AND USE OF A SYSTEM OF FEMININE HYGIENE PRODUCTS

CROSS REFERENCE TO RELATED APPLICATIONS

This application claims the benefits of U.S. Provisional Application No. 60/334,874, filed on Nov. 15, 2001.

TECHNICAL FIELD

The present invention is directed to methods for the selection and use of a system of feminine hygiene products. More particularly, the present invention is directed to a method in which information is collected from a consumer regarding certain characteristics of her menstrual cycle. The information collected is used to select a particular system of feminine hygiene products for use by the consumer. The system of products selected is then revealed to the consumer for use by the consumer to achieve a reduction in soiling and improvements in comfort as compared to the use of a single type of feminine hygiene products.

BACKGROUND OF THE INVENTION

A woman's menstrual cycle is typically characterized by initial light flow which subsequently increases and finally tapers off to the end of the period. Additionally, women all have different levels of overall menstrual flow throughout their cycle. In attempt to meet these varying needs, numerous absorbencies of tampons are provided in the market place. However, many women are forced to purchase more than one product to meet their varying needs throughout their cycle, or to settle for inferior protection and/or some discomfort.

It has also been found that many women are not proficient in accurately describing their flow intensity as compared to other consumers. Most currently available feminine hygiene products describe the differences between the various available products only in terms of a consumer's assessment of her own overall protection needs. This especially causes problems for tampon use. Underestimation of flow intensity can result in soiling, whereas overestimation may result in an uncomfortable use experience for the consumer.

Consequently, the need remains for providing information to the consumer for the selection and use of tampons to achieve a reduction in soiling and improvements in comfort.

SUMMARY OF THE INVENTION

In accordance with a first aspect of the present invention, a method of providing an individual protection system consisting of feminine hygiene products to a consumer is provided. The method comprises the steps of:

(a) collecting input information from an individual consumer regarding her menstrual cycle characteristics wherein at least some of the information collected includes data expected to be readily known by most consumers using the method, said information including at least the perceived flow of the consumer on the heaviest flow day during the consumer's menstrual cycle;

(b) using the input information collected in step (a) to develop feedback information by identifying an individual protection system wherein the individual protection system is adapted to correspond to composite data from multiple consumers falling within a predetermined range of menstrual cycle characteristics, wherein the individual protection system comprises a plurality of first tampons and a plurality of second tampons; and (c) providing said feedback information to the consumer regarding the individual protection system thereby allowing the consumer to select and use said individual protection system to provide optimum protection and comfort at any particular instant during the consumer's menstrual cycle.

In accordance with a second aspect of the present invention, a method of using feminine hygiene products by a consumer is provided. The method comprises the steps of:

(a) providing input information regarding the consumer's menstrual cycle characteristics to a system selection interface, wherein the menstrual cycle characteristics include the perceived flow of the consumer on the heaviest flow day during the consumer's menstrual cycle;

(b) receiving feedback information based on the input information from step (a) to allow selection of an individual protection system for feminine hygiene products for the consumer from at least two available different types of said individual protection system by said system selection interface, wherein each of said individual protection system is adapted to correspond to a predetermined range of menstrual cycle characteristics, and comprises a plurality of first tampons and a plurality of second tampons; and (c) delivering the information from the system selection interface regarding the first tampons and the second tampons which make up the selected individual protection system thereby allowing the consumer to use the selected individual protection system in a manner to provide optimum protection and comfort for the consumer at any particular instant during the consumer's menstrual cycle.

All patents, articles, documents, and other materials cited herein are hereby incorporated by reference, unless otherwise indicated.

All percentages, ratios and proportions are by number, and all temperatures are in degrees Celsius (° C.), unless otherwise specified. All measurements are in SI units unless otherwise specified.

DETAILED DESCRIPTION OF THE INVENTION

As used herein the term "tampon" refers to any type of absorbent structure which is inserted into the vaginal canal for the absorption of fluid therefrom. Typically, tampons are constructed from an absorbent material which has been compressed in any or all of: the width direction; the radial direction; and the axial direction, in order to provide a tampon which is of a size and stability to allow insertion within the vagina. See, for example, U.S. Pat. No. 5,087,239 issued to Beastall et al. and U.S. Pat. No. 5,279,541 issued to Frayman et al. which are incorporated herein by reference in their entirety.

As used herein, the term "common package" refers to a package, which may be optionally sealed, used to distribute the final tampon product. The term "common package" includes: a unitary package housing all of the tampons of the final product being distributed/sold to the consumer; a unitary package housing smaller, individual packages or units which each house or group portions of the tampons of the final product being distributed/sold to the consumer; and/or a set of individual unitary packages grouped together to form a the final product being distributed/sold to the consumer. As such, the term "common package" includes, but is not limited to, paperboard or plastic containers or cans (with or without individual sleeves or other means for separating various absorbencies of tampons therein) and individually sealed packages which are connected together (e.g. by glue, string, shrink wrap, etc.) to form the final product being distributed/sold to the consumer.

As used herein, the term "comprising" means that the various components, ingredients, or steps, can be conjointly employed in practicing the present invention. Accordingly, the term "comprising" encompasses the more restrictive terms "consisting essentially of" and "consisting of." The percentage of tampons provided for various products is based on the total number of tampons in the common package. Other terms may be defined as they are discussed in greater detail below.

(a) Collecting Information—

In one particularly preferred embodiment of the method of the present invention, the step of collecting information from a consumer selecting an individual protection system is performed in a substantially continuous, interactive process. For example, the information may be collected from a consumer and an individual protection system selected through the use of an interactive store display. Such a display may be equipped with an interactive computer which will prompt the user to answer questions, keep track of the answers, and select an appropriate individual protection system based on feedback developed from those answers as described above. In alternative embodiments, the information may be collected from a consumer though the use of an interactive site on the World Wide Web, an interactive in-store display, a modified slide-rule type device or through the use of an interactive menu-driven phone system. Charts, tables or other figures may be used to collect information from a consumer and take the consumer through the individual protection system process described above. These charts or figures may be located on an in-store display in in-store advertising or on the packaging. Similarly, charts or figures may be published in publications such as newspapers or magazines or mailed to potential consumers. It is also possible for information regarding the use of individual protection system in accordance with the method of the present invention to be distributed to providers of women's health care services. In such scenarios, the interaction described in the present application could take place between a consumer and her OB/GYN or other health care provider.

In one embodiment of the present invention the input information collected from the consumer will be in response to questions. The consumer's response to these questions may then be used to determine the individual protection system for the consumer. These questions may be focused on, for example, the tampon applicator(s) most suitable for the consumer, the tampon absorbency required or some combination of these two. Furthermore, these questions may be asked of the consumer in any suitable fashion, for example, via interactive site on the World Wide Web, an interactive in-store display, or through the use of an interactive menu-driven phone system.

In one preferred embodiment of the present invention the selection of an individual protection system for the consumer may for example include, but is not limited to, asking the consumer questions such as: the consumer's age; consumer's tampon applicator preference; consumer's prior tampon applicator use; consumer's prior tampon use; what other feminine hygiene products the consumer has used or is currently using; consumer's description of her flow on her heaviest day of her period; how many tampons in total does the consumer use in her period; time between changing tampons on the consumer's heaviest day; leaks, if any while using a tampon on the consumer's heaviest day; and what is the consumer's confidence that when the tampon is changed during the heaviest time that the tampon has been fully used.

In another preferred embodiment of the present invention the selection of an individual protection system for the consumer may, for example, be based on a profile, segment, and/or classification of consumers generally. That is, the entire group of consumers, namely any woman in need of feminine protection, may be separated into distinct categories for which suitable individual protection system may be provided. These categories may be identified as profile, segment, and/or classification. This separation into profile, segment, and/or classification may be produced in any suitable fashion, including but not limited to, questions asked of consumers, such as questions about habits, traits, personality, and/or responses to visual situations and/or images of the consumers. The profile, segment, and/or classification into which a particular consumer belongs to may be similarly performed. Questions similar to those used in identifying the profile, segment, and/or classification may be used to select the individual protection system for the consumer depending on which profile, segment, and/or classification the consumer belongs to. These questions, for example, may be based on habits, traits, personality, and/or responses to visual situations and/or images of the consumers. One system of question asking to classify consumers into profile, segment, and/or classification is psychographic segmentation.

One skilled in the art will readily appreciate that numerous combinations of either individual questions or groups of questions may be asked in order to collect sufficient information to provide the basis for recommending an individual protection system for any particular consumer. The precise manner and wording chosen to collect this information from the consumer may vary depending on local custom, the comfort level consumers in a particular area may have in describing their menstrual flow characteristics, and the shades of meaning associated with terms which may be used in different parts of the world to collect the information desired. It is to be further understood that the methods of the present invention are not to be limited to any one type of question asking methodology or philosophy.

In another alternative embodiment the information may be collected and stored in a portable electronic device. A non-limiting example of such a device is disclosed in U.S. patent application No. PCT/US00/29764 entitled "Device and method for providing information on body fluids related matter" filed on Oct. 27, 2000 assigned to Procter & Gamble, Attorney docket No. AA506.

After having collected information from a consumer and having identified an individual protection system, the method of the present invention calls for providing feedback information to the consumer identifying the tampons which make up the individual protection system, thereby prompting the consumer to select and use the individual protection system. This provision of information to the consumer may be through the use of packaging indicia, for example, in one preferred embodiment where there are four available individual protection system of tampons, each of the four individual protection system having a unique number, color, symbol, or some combination of these, associated with it. Tampons which make up each of the four individual protection system may then be packaged in packages marked with the corresponding unique number, color, or symbol.

In other alternative embodiments, a dispensing device can be provided with a mechanism or means for conveying to a consumer a description of an individual protection system. Suitable mechanisms for conveying this information to a consumer can include, but are not limited to: a chart that the consumer can read; a dial that the consumer can move to identify her needs and obtain an indication of a individual protection system; or an interactive computer. The latter type device (the interactive computer) can, for instance, prompt a consumer to input several (e.g., three to four) key pieces of information and, based upon this, provide the consumer with a recommendation or prescription for an individual protection system that will optimize the use of the tampons. Such key pieces of information can include, but are not limited to, perceived flow (e.g., light, moderate, or heavy), and current preferred product.

In still other embodiments, more automated types of product selection and dispensing systems currently available may be used. In yet other embodiments, the product selection may also be a product-dispensing device which groups together and packages or wraps the products selected for the individual protection system into a single package for the consumer.

In one preferred embodiment of the method of the present invention, the tampons making up each of the available systems are packaged together in a common package. This allows a consumer to purchase an entire individual protection system in one package without having to assembly the required tampons herself. In other preferred embodiments of the method of the present invention, the tampons making up the individual protection system could be packaged individually or in packages of, for example, about 2 to 9 tampons per package. Such individually packaged tampons could be housed in a display stand which allows consumers to select a variety of tampons and to assemble an individual protection system once feedback information identifying those tampons which make up the individual protection system is received by the consumer. In other embodiments, the feedback information provided to the consumer might simply be a list of the commercial names of available tampons which make up the individual protection system.

(b) Menstrual Cycle Characteristics—

It has been found during development of the present invention that certain key pieces of information regarding the menstrual flow characteristics of a particular consumer may be used to assist her in the selection of a system of feminine protection products which is particularly adapted to her needs. The use of such an adapted system will preferably achieve a reduction in the incidence of soiling as compared to the use of a single type of feminine hygiene product, as well as optimization of comfort and protection for the consumer during use of the tampon.

It has also been found during the development of the present invention that the information pertaining to flow rate and to period length and volume are closely related. Although this is typically the case, a consumer's self-perception of her flow is often not an accurate indicator of her "true" flow intensity. Therefore, in more preferred embodiments of the method of the present invention, the proper flow intensity for a particular consumer may be ascertained by asking that consumer to describe her perceived flow intensity from a list consisting of: "light", "moderate", and "heavy". An alternative list could consist of: "light", "light to moderate", and "moderate to heavy". In these more preferred embodiments, if input information regarding perceived flow intensity is elicited from the consumer in the manner described above, then the questions or prompts used to collect information from the consumer regarding period length and volume should be more objective (as opposed to relating to the consumer's self-perception). For example, if flow intensity information is collected by asking a consumer to choose which term from either of the lists given above best describes her flow intensity, then period length and volume information could be collected by asking a consumer how long she menstruates in a typical cycle and/or how many heavy days or nights she experiences in a typical cycle.

Another indicator of menstruation and volume category is the number of times in a typical cycle a consumer replaces a used feminine hygiene product with a fresh one. The type of tampon currently used by a consumer may provide information as to her flow rate. Related to this indicator is the loading of a product before it is replaced with a fresh product. The typical loading for a feminine hygiene product before replacement tends to vary by regional practices and customs. Therefore, feedback information based on the number of fresh products used in a cycle as an indicator of period duration and volume should take typical regional practices and customs into account. Alternatively, this information can be used to determine if the tampons currently used by the consumer are effective. Routine changes of partially used tampons could indicate that a less absorbent tampon is needed for that stage of the menstrual cycle, whereas a "full" or leaking tampon could be an indication that a more absorbent tampon is needed.

Using questions which relate to facts which are objective and which are expected to be known by a given consumer helps to ensure that the individual protection system selected for the consumer will be the most appropriate. This approach also reduces reliance on subjective assessments by consumers (such as self-perception of flow without further verification) which are often inaccurate.

Once information is collected from a consumer, an individual protection system is selected. The individual protection system contains a plurality of first tampons and a plurality of second tampons.

(c) Individual Protection System—

The methods of the present invention relate to the selection of an individual protection system for the consumer. One preferred embodiment of this of the aspect of the present invention relates to a method where the individual protection system is selected from at least two different types of individual protection systems. In a more preferred embodiment of this of the aspect of the present invention relates to a method where the individual protection system is selected from two to twenty different types of individual protection systems. By having multiple prospective protection systems available, the particular protection system to an individual consumer may be tailored to meet varying menstrual flow needs, type etc, across the span of her menstrual cycle, with quite different systems being available to meet the different needs of other consumers.

The individual protection system of the present invention comprises at least plurality of first tampons and a plurality of second tampons. For instance, the first tampons may all be digital tampons or could all utilize the same type of applicator (e.g. plastic or paperboard, petals or open ended). Consumer product lines typically display their products in close proximity to one another on the store shelves and often use similar packaging and or nomenclature to designate a particular line. Tailoring the individual protection system to meet menstrual flow needs of various segments of women provides a greater number of women with a single product option to provide the appropriate mix of tampon products throughout their entire cycle. The term "tailored" means to customize or specially design with a set of facts in mind. The phrase "menstrual flow needs" as used herein refers both to the need to protect against menses leakage (e.g. staining of clothing) as well as the need for a comfortable protection device (e.g. comfort while wearing and removing). For ease of describing this concept, one segment of women are designated as having "low menstrual flow", another having "moderate menstrual flow", and yet another as having "high menstrual flow". The meanings of these labeled segments can be based on the women's own conception of their menstrual flow and are not intended to limit the scope of the invention, particularly where a manufacturer chooses to define segments of women in different descriptive terms, but still tailor individual protection system to meet the menstrual flow needs of these segments.

The plurality of first tampons is a group of two or more tampons which can be the same or different. That is, they may have the same applicator type as well as the same absorbency. Alternatively, they may have different applicators but have the same absorbency, or have the same applicators but have different levels absorbency. Similarly, the plurality of second tampons is a group of two or more tampons which can be the same or different. That is, they may have the same applicator type as well as the same absorbency. Alternatively, they may have different applicators but have the same absorbency, or have the same applicators but have different absorbency. However, regardless of how many and what types of tampons make up the plurality of second tampons, the plurality of second tampons is different from those of the plurality of first tampons. For example if the plurality of first tampons consists of 3 low absorbency tampons with plastic applicators, the plurality of second tampons could not consist only of 3 low absorbency tampons with plastic applicators. However, in this example the plurality of second tampons could consist of 3 medium absorbency tampons with plastic applicators, 3 low absorbency tampons with cardboard (either open ended or close ended) applicators, or 2 low absorbency tampons with plastic applicators plus 4 heavy absorbency tampons with plastic applicators. In any event the choice of the tampons that comprise the plurality of first tampons and plurality of second tampons is tailored to meet the needs of the consumer.

In an optional embodiment of the present invention the individual protection system comprising the plurality of first tampons and plurality of second tampons may be provided in modularized multi-packs. "Modularized multi-packs" are consumer product lines of multi-packs which utilize the use of modules of various absorbencies of tampons across the product line. More specifically, in the most basic form, a set of "modularized multi-packs" comprises a first multi-pack comprising a plurality of first tampons and a second multi-pack comprises a plurality of second tampons. The first multi-pack and the second multi-pack differ in total tampon count, and/or tampon absorbency percentage make-up, regardless of tampon count (e.g. a first multi-pack having 35% Juniors and 65% Regulars, a second type of multi-pack having 50% Juniors and 50% Regulars) as well as those which differ only in absorbency count, but not percentage make-up (e.g. all multi-packs have 10% Juniors, 45% Regulars, and 45% Supers; The first multi-pack has 40 tampons: 4 Juniors, 18 Regulars, and 18 Supers; the second multi-pack has 80 tampons: 8 Juniors, 36 Regulars, and 36 Supers). While the individual protection system used in the methods of the present invention need not be in the form of modularized multi-packs, doing so provides a way to maintain the flexibility needed to produce the specially tailored products of the present invention in a highly mechanical, mass production setting by enabling an efficient integration of multi-pack packaging cartoners with tampon converter productions lines.

In one embodiment creation of a plurality of first tampons and a plurality of second tampons is achieved by made by grouping a predetermined number of a first absorbency of tampons; by grouping a predetermined number of a second absorbency of tampons; combining at least one of the first groupings of tampons with at least one of the second groupings of tampons in a common package to form a plurality of first tampons; and combining at least one of first groupings of tampons with at least one of the second groupings of tampons in a common package to form a plurality of second tampons, which is different in some fashion to the plurality of first tampons, such as number, absorbency, applicator, etc. "Grouping" refers to any means for accomplishing unitization of the predetermined number of single absorbency of tampons forming the plurality of first tampons or plurality of second tampons. Grouping can be accomplished during the packaging process and the grouping means removed prior to or upon insertion of the plurality of first tampons or plurality of second tampons into the final common package forming the individual protection system. Alternatively, grouping can be accomplished by a means which is included in or as part of the final common package. For example, a receptacle which is part of the packaging equipment rather than part of the final packaged product may temporarily group a predetermined number of tampons to form a plurality of first tampons or plurality of second tampons on an assembly line. Alternatively, the plurality of first tampons or the plurality of second tampons can be formed by grouping tampons in receptacles including, but not limited to, open sleeve cartons, tubes, canisters, plastic bags, sealed boxes or other containers, etc. Grouping may also be accomplished by binding the single absorbency tampons together with something, for example, such as film, shrink wrap, string, twine, a rubber band, releasable glue, etc.

By using this modular approach to packaging different types of plurality of first tampons or plurality of second tampons, fewer plurality of first tampons or plurality of second tampons (and grouping means) can be used to form a wide variety of individual protection system instead of requiring completely different plurality of first tampons or plurality of second tampons (and grouping means) for each type of individual protection system. Thus, the production plant will minimize equipment size changeovers and lines, resulting in higher production reliability. This all translates into lower operating costs. More specific examples of individual protection systems will illustrate this efficiency, but are not intended to limit the scope of the invention. Further disclosure on this modular approach may be found in the co-pending U.S. patent application Ser. No. 10/283,502 filed on Sep. 10, 2002 entitled "CONSUMER PRODUCT LINES AND PRODUCTS COMPRISING COMMONLY PACKAGED TAMPONS WHICH HAVE VARYING ABSORBENT CAPACITIES" assigned to Procter & Gamble, Attorney Docket No. 8707M which claims the benefit of U.S. Provisional Patent Application No. 60/318,341 filed on Sep. 10, 2001 entitled "CONSUMER PRODUCT LINES AND PRODUCTS COMPRISING COMMONLY PACKAGED TAMPONS WHICH HAVE VARYING ABSORBENT CAPACITIES" assigned to Procter & Gamble, Attorney Docket No. 8707P.

EXAMPLES

Example 1

Two different individual protection systems of 40 count multi-packs may be formed. The plurality of first tampons comprises 16 Juniors (40%) and 24 Regulars (60%). The plurality of second tampons comprises 8 Juniors (20%), and 32 Regulars (80%). First modules of Junior tampons are formed by grouping 8 Junior tampons together (e.g. in paperboard sleeves). Similarly, grouping 8 Regular tampons together forms a second module of tampons. The plurality of first tampons can then be made by combining 2 of the Junior modules of tampons with 3 of the Regular modules of tampons. The plurality of second tampons can be formed by combining 1 of the Junior modules with 4 of the Regular modules. Thus, the plurality of first tampons and plurality of second tampons utilize the same modules of tampons to be completely different and can do so easily in a high speed setting as is readily apparent to one of ordinary skill in the art. Absent this method of first creating common modules of tampons for use in the plurality of first tampons and plurality of second tampons, four different kinds of sleeves would have been necessary to produce these the plurality of first tampons and plurality of second tampons; a sleeve for 16 Juniors, a sleeve for 8 Juniors, a sleeve for 24 Regulars, and a sleeve for 32 Regulars.

Example 2

A woman in the feminine protection aisle at a store approaches an in-store kiosk. She answers several questions at the kiosk pertaining to her menstrual flow and her tampon applicator preferences. Based on her responses the software in the kiosk assigns her to one of three pre-defined flow groups: Low Flow, Moderate Flow, or Heavy Flow. It then recommends the appropriate Multipack for her flow group as well as he preferred applicator type from the following choices below:

|  | Low Flow Multipack | Moderate Flow Multipack | Heavy Flow Multipack |
| --- | --- | --- | --- |
| Junior Absorbency | 16 | 4 | — |
| Regular Absorbency | 24 | 18 | 12 |
| Super Absorbency | — | 18 | 12 |
| Super Plus Absorbency | — | — | 16 |

Applicator Types: Cardboard or Plastic

She then prints out her product recommendation along with other information and helpful hints to teach her how and when to use the suggested products. She uses the recommendation to find her Multipack on shelf and then purchases the product.

Example 3

A woman in the feminine protection aisle at a store approaches an in-store kiosk. She answers several questions at the kiosk pertaining to her menstrual flow and her tampon applicator preferences. Based on her responses, the software in the kiosk differentiates her needs and preferences between three available options Low Flow group, Moderate Flow group, Heavy Flow group and assigns her to the Low Flow group with a preference for plastic applicators. It then recommends the Low Flow Multipack, shown below, with plastic applicators.

|  | Low Flow Multipack | Moderate Flow Multipack | Heavy Flow Multipack |
| --- | --- | --- | --- |
| Junior Absorbency | 16 | 4 | — |
| Regular Absorbency | 24 | 18 | 12 |
| Super Absorbency | — | 18 | 12 |
| Super Plus Absorbency | — | — | 16 |

She then prints out her product recommendation along with other information and helpful hints to teach her how and when to use the suggested products. She uses the recommendation to find the Low Flow Multipack on shelf and then purchases the product.

Example 4

A woman visits a feminine protection web site to learn about what products are best for her. She answers several questions at the site pertaining to her menstrual flow and her tampon applicator preferences. Based on her responses the software on the site recommends a combination of absorbencies based on one of three pre-defined flow groups: Low Flow, Moderate Flow, or Heavy Flow.

|  | Low Flow | Moderate Flow | Heavy Flow |
| --- | --- | --- | --- |
| Junior Absorbency | Yes | Yes | Yes |
| Regular Absorbency | Yes | Yes | Yes |
| Super Absorbency | — | Yes | Yes |
| Super Plus Absorbency | — | — | Yes |

The software then recommends the appropriate market packages containing these absorbencies. The woman prints out her product recommendation along with other information and helpful hints to teach her how and when to use the suggested products. She takes the recommendation with her to the store and uses it to find the suggested market packages and purchases those products.

Example 5

A woman visits a feminine protection web site to learn about what products are best for her. She answers several questions at the site pertaining to her menstrual flow and her tampon applicator preferences. Based on her responses the software on the site recommends a combination of absorbencies, shown below, based on designating her as a Heavy Flow woman who prefers cardboard applicators.

|  | Low Flow | Moderate Flow | Heavy Flow |
| --- | --- | --- | --- |
| Junior Absorbency | Yes | Yes | Yes |
| Regular Absorbency | Yes | Yes | Yes |
| Super Absorbency | — | Yes | Yes |
| Super Plus Absorbency | — | — | Yes |

The software then recommends a multipack containing Junior, Regular and Super absorbency tampons and a single absorbency package of Super Plus, both with cardboard applicators, as a means for her to obtain the recommended products. The woman prints out her product recommendation along with other information and helpful hints to teach her how and when to use the suggested products. She takes the recommendation with her to the store and uses it to find the multipack and Super Plus packages and purchases those products.

Example 6

This example is identical to that of Example 3, except instead of using software to assign the woman to a flow group and the recommend an individual protection system, a modified slide-rule type device is used instead. The information on the product recommendation along with additional information is contained in the information provided by the modified slide-rule type device.

What is claimed is:

1. A method of providing an individual protection system consisting of feminine hygiene products to a consumer, said method comprising the steps of:
   (a) collecting input information from an individual consumer regarding her menstrual cycle characteristics wherein at least some of said information collected includes data expected to be readily known by most consumers, said information including at least the perceived flow of the consumer on the heaviest flow day during said consumer's menstrual cycle;
   (b) using said input information collected in step (a) to develop feedback information by identifying an individual protection system wherein said individual protection system is adapted to correspond to composite data from multiple consumers falling within a predetermined range of menstrual cycle characteristics, wherein said individual protection system comprises a plurality of first tampons and a plurality of second tampons; and
   (c) providing information to said consumer regarding said individual protection system thereby allowing said consumer to use said individual protection system to provide optimum protection and comfort for said consumer at any particular instant during said consumer's menstrual cycle.

2. The method of claim 1 wherein the steps of collecting information from a consumer and selecting said individual protection system are performed using a computer.

3. The method of claim 1 wherein the steps of collecting information from a consumer and selecting said individual protection system are performed using an interactive m-store display.

4. The method of claim 1 wherein the steps of collecting information from a consumer and selecting said individual protection system are performed using a telephone system.

5. The method of claim 1 wherein the step of providing said information to the consumer regarding said plurality of first tampons and said plurality of second tampons which make up said individual protection system is accomplished through the use of packaging indicia.

6. The method of claim 1 wherein said plurality of first tampons and said plurality of second tampons comprising said individual protection system are packaged in a common package.

7. The method of claim 1 further comprising the step of:
   d) providing a dispensing device containing said plurality of first tampons and said plurality of second tampons, wherein said dispensing device is provided with means for allowing said consumer to retrieve said plurality of first tampons and said plurality of second tampons which make up said individual protection system.

8. A method of using feminine hygiene products by a consumer, said method comprising the steps of:
   (a) providing information regarding the consumer's menstrual cycle characteristics to a system selection interface, wherein said menstrual cycle characteristics include the perceived flow of the consumer on the heaviest flow day during said consumer's menstrual cycle;
   (b) selection of an individual protection system for said consumer from at least two available different types of said individual protection system by said system selection interface, wherein each of said individual protection system is adapted to correspond to a predetermined range of menstrual cycle characteristics, and comprises a plurality of first tampons and a plurality of second tampons; and
   (c) receiving information from said system selection interface regarding said first tampons and said second tampons which make up said selected individual protection system thereby allowing the consumer to use said selected individual protection system in a manner to provide optimum protection and comfort for said consumer at any particular instant during said consumer's menstrual cycle.

9. The method of claim 8 wherein the number of available different types of said individual protection system is from 2 to 20.

10. The method of claim 8 wherein said system selection interface comprises an interactive computer.

11. The method of claim 8 wherein said system selection interface comprises a modified slide-rule type device.

12. The method of claim 8 wherein said system selection interface comprises a printed chart and accompanying instructions for use.

13. The method of claim 8 wherein the steps of said information regarding a consumer's menstrual cycle characteristics and selecting said individual protection system are performed using an interactive in-store display.

14. The method of claim 8 wherein the steps of providing said information regarding a consumer's menstrual cycle characteristics and selecting said individual protection system are performed through the use of packaging indicia.

15. The method of claim 8 wherein said plurality of first tampons and said plurality of second tampons of said selected individual protection system are packaged in a common package.

16. The method of claim 8 further comprising the step of:
   d) providing a dispensing device containing said plurality of first tampons and said plurality of second tampons, wherein said dispensing device is provided with means for allowing said consumer to retrieve said plurality of first tampons and said plurality of second tampons which make up said individual protection system.

* * * * *